US008553618B2

(12) United States Patent
Ko et al.

(10) Patent No.: US 8,553,618 B2
(45) Date of Patent: Oct. 8, 2013

(54) APPARATUS AND METHOD FOR DATA TRANSMISSION USING TRANSMIT DIVERSITY IN SC-FDMA SYSTEM

(75) Inventors: Hyun Soo Ko, Gyeongki-do (KR); Seung Hee Han, Gyeongki-do (KR); Jea Hoon Chung, Gyeongki-do (KR); Bin Chul Ihm, Gyeongki-do (KR); Moon Il Lee, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 386 days.

(21) Appl. No.: 13/000,706

(22) PCT Filed: Jun. 26, 2009

(86) PCT No.: PCT/KR2009/003466
§ 371 (c)(1),
(2), (4) Date: Dec. 22, 2010

(87) PCT Pub. No.: WO2009/157734
PCT Pub. Date: Dec. 30, 2009

(65) Prior Publication Data
US 2011/0103341 A1   May 5, 2011

Related U.S. Application Data

(60) Provisional application No. 61/075,754, filed on Jun. 26, 2008, provisional application No. 61/081,377, filed on Jul. 16, 2008, provisional application No. 61/088,353, filed on Aug. 13, 2008.

(30) Foreign Application Priority Data

Dec. 26, 2008 (KR) .................. 10-2008-0134255

(51) Int. Cl.
*H04W 4/00* (2009.01)
(52) U.S. Cl.
USPC .................. 370/328; 455/402; 455/422.1

(58) Field of Classification Search
USPC .................. 370/203–211, 310–350
See application file for complete search history.

(56) References Cited

U.S. PATENT DOCUMENTS 6,888,809 B1   5/2005   Foschini et al.
7,881,247 B2   2/2011   Pan et al.

(Continued)

FOREIGN PATENT DOCUMENTS

KR   10-2001-0076252   8/2001
KR   2005-0069802   7/2005

(Continued)

OTHER PUBLICATIONS

Notice of Allowance mailed from the USPTO on Nov. 15, 2012 for the corresponding U.S. Appl. No. 13/058,488.

(Continued)

*Primary Examiner* — Charles C Jiang
(74) *Attorney, Agent, or Firm* — Morgan, Lewis & Bockius LLP (57) ABSTRACT

An apparatus for data transmission is provided. The apparatus includes a data processor encoding an information bit and generating a modulation symbol by performing constellation mapping on the encoded information bit, a discrete Fourier transform (DFT) unit performing DFT on the modulation symbol to generate a frequency-domain symbol, a space time block coding (STBC) processor performing STBC on the frequency-domain symbol to generate an STBC code consisting of 1st and 2nd STBC streams, a subcarrier mapper mapping the 1st STBC stream to a 1st subcarrier and mapping the 2nd STBC stream to a 2nd subcarrier, an inverse fast Fourier transform (IFFT) unit performing IFFT on the 1st subcarrier to generate a 1st single carrier-frequency division multiple access (SC-FDMA) symbol and performing IFFT on the 2nd subcarrier to generate a 2nd SC-FDMA symbol, and a plurality of transmit antennas transmitting the 1st and 2nd SC-FDMA symbols. STBC is effectively applied to a SC-FDMA system to decrease a peak-to-average power ratio (PAPR) and to maintain a single-carrier property.

9 Claims, 4 Drawing Sheets

(56) References Cited

U.S. PATENT DOCUMENTS

| | | | |
|---|---|---|---|
| 8,068,555 | B2 | 11/2011 | Jongren et al. |
| 8,095,143 | B2 | 1/2012 | Amirijoo et al. |
| 2003/0139139 | A1 | 7/2003 | Onggosanuisi et al. |
| 2004/0077378 | A1 | 4/2004 | Kim et al. |
| 2005/0265280 | A1 | 12/2005 | Roh et al. |
| 2006/0067421 | A1 | 3/2006 | Walton et al. |
| 2007/0004465 | A1 | 1/2007 | Papasakellariou et al. |
| 2007/0115795 | A1 | 5/2007 | Gore et al. |
| 2007/0189151 | A1* | 8/2007 | Pan et al. ............. 370/210 |
| 2007/0211822 | A1* | 9/2007 | Olesen et al. .......... 375/299 |
| 2008/0032746 | A1 | 2/2008 | Olesen et al. |
| 2008/0056117 | A1 | 3/2008 | Muharemovic et al. |
| 2008/0080472 | A1 | 4/2008 | Bertrand et al. |
| 2008/0080637 | A1 | 4/2008 | Khan et al. |
| 2008/0089441 | A1 | 4/2008 | Hwang et al. |
| 2008/0095252 | A1 | 4/2008 | Kim et al. |
| 2008/0117999 | A1 | 5/2008 | Kadous et al. |
| 2008/0165891 | A1 | 7/2008 | Budianu et al. |
| 2008/0279170 | A1* | 11/2008 | Malladi et al. ............ 370/343 |
| 2008/0307427 | A1* | 12/2008 | Pi et al. ............... 718/104 |
| 2009/0073922 | A1 | 3/2009 | Malladi et al. |
| 2009/0202016 | A1 | 8/2009 | Seong et al. |
| 2009/0279447 | A1 | 11/2009 | Mehta et al. |
| 2010/0091903 | A1* | 4/2010 | Castelain et al. ............ 375/295 |
| 2010/0091919 | A1 | 4/2010 | Xu et al. |
| 2010/0111209 | A1 | 5/2010 | Frenger |
| 2011/0228728 | A1 | 9/2011 | Baligh et al. |

FOREIGN PATENT DOCUMENTS

| | | |
|---|---|---|
| KR | 2006-0048106 | 5/2006 |
| KR | 10-0698199 B | 3/2007 |
| KR | 10-0785806 | 12/2007 |
| KR | 10-0785806 B | 12/2007 |
| KR | 2008-0025260 | 3/2008 |
| KR | 10-0899735 B | 5/2009 |
| WO | 03/085876 | 10/2003 |
| WO | 2008-054322 A2 | 5/2008 |

OTHER PUBLICATIONS

Office Action mailed from the USPTO on Nov. 29, 2012 for the corresponding U.S. Appl. No. 13/000,470.

U.S. Appl. No. 61/074,399, filed Jun. 20, 2008, cited in the office action issued in corresponding U.S. Appl. No. 13/000,470.

International Search Report from related technology PCT Application No. PCT/KR2009/003037.

U.S. Office Action for U.S. Appl. No. 13/000,958 dated Oct. 18, 2012.

U.S. Office Action for U.S. Appl. No. 13/001,219 dated Oct. 25, 2012.

C. Ciochina et al., "Single-Carrier Space-Frequency Block Coding Performance Evaluation", IEEE 66th Vehicular Technology Conference, 2007, pp. 715-719.

International Search Report from PCT/KR2009/003487.

International Search Report from PCT/KR2009/003466.

International Search Report from PCT/KR2009/003026.

International Search Report from PCT/KR2009/003012.

International Search Report from PCT/KR2009/003027.

USPTO—Office Action for U.S. Appl. No. 13/001,219—Issued on Feb. 15, 2013.

USPTO—Office Action—Non-Final for U.S. Appl. No. 13/000,546—Issued on Feb. 8, 2013.

* cited by examiner

⊠ :CONTINUOUS SC-FDMA SYMBOL PAIR
▨ :DISCONTINUOUS SC-FDMA SYMBOL PAIR

Fig. 8

⊠ :CONTINUOUS SC-FDMA SYMBOL PAIR
▨ :DISCONTINUOUS SC-FDMA SYMBOL PAIR

Fig. 9

APPARATUS AND METHOD FOR DATA TRANSMISSION USING TRANSMIT DIVERSITY IN SC-FDMA SYSTEM

The present application is a national stage of PCT International Application No. PCT/KR2009/003466, filed Jun. 26, 2009, which claims the benefit of U.S. Provisional Application Nos. 61/075,754, filed Jun. 26, 2008; 61/081,377, filed Jul. 16, 2008; and 61/088,353, filed Aug. 13, 2008, and claims the benefit of Korean Application No. 10-2008-0134255, filed Dec. 26, 2008.

TECHNICAL FIELD

The present invention relates to wireless communications, and more particularly, to an apparatus and method for data transmission using transmit diversity in a single carrier-frequency division multiple access (SC-FDMA) system.

BACKGROUND ART

Recently, there has been an explosive increase in the demand for wireless data services. Further, an evolution from a wireless voice service to a wireless data service requires a gradual increase of wireless capacity. To cope with such a demand, wireless service providers and wireless equipment manufacturers attempt to improve a data transfer rate of a wireless system, which results in motivating massive researches.

A wireless channel experiences various problems such as path loss, shadowing, fading, noise, limited bandwidth, power limit of a user equipment (UE), and interference between other users. Due to these limitations, the wireless channel has a shape of a narrow pipe that obstructs fast data flow, and it is difficult to design an effective bandwidth of wireless communication providing high-speed data transmission. The designing of the wireless system has other challenges such as resource allocation, mobile issues in association with a rapidly changing physical channel, portability, security, and privacy.

When a transport channel experiences deep fading, if a different version or a replica of a transmitted signal is not additionally transmitted, it is difficult for a receiver to determine the transmitted signal. A resource corresponding to the different version or the replica is referred to as diversity, and is one of most important factors that contribute to reliable transmission over a wireless channel. The use of the diversity can maximize data transfer capacity or data transfer reliability. A system for implementing the diversity by using multiple transmit (Tx) antennas and multiple receive (Rx) antennas is referred to as a multiple input multiple output (MIMO) system. The MIMO system is also referred to as a multiple antenna system.

The MIMO system implements the diversity by using various schemes, for example, space frequency block coding (SFBC), space time block coding (STBC), cyclic delay diversity (CDD), frequency switched transmit diversity (FSTD), time switched transmit diversity (TSTD), precoding vector switching (PVS), spatial multiplexing (SM), generalized cyclic delay diversity (GCDD), selective virtual antenna permutation (S-VAP), etc.

An orthogonal frequency division multiplexing (OFDM) system capable of reducing inter-symbol interference with a low complexity is taken into consideration as one of post-3rd generation wireless communication systems. In the OFDM, a serially input data symbol is converted into N parallel data symbols, and is then transmitted by being carried on N orthogonal subcarriers. The subcarriers maintain orthogonality in a frequency dimension. In a system using the OFDM as a modulation scheme, orthogonal frequency division multiple access (OFDMA) is a multiple access scheme in which multiple access is achieved by independently providing some of available sub-carriers to each user.

One of main problems of the OFDM/OFDMA system is that peak-to-average power ratio (PAPR) can be significantly large. The PAPR problem occurs when a peak amplitude of a Tx signal is significantly larger than an average amplitude. Further, the PAPR problem is caused by a fact that an OFDM symbol is an overlap of N sinusoidal signals on different subcarriers. The PAPR is particularly problematic in a UE sensitive to power consumption in association with battery capacity. The PAPR needs to be lowered to reduce power consumption.

Single carrier-frequency division multiple access (SC-FDMA) is proposed to decrease the PAPR. The SC-FDMA is single carrier-frequency division equalization (SC-FDE) combined with frequency division multiple access (FDMA). The SC-FDMA is similar to the OFDMA in that data is modulated and demodulated in a time domain and a frequency domain by using discrete Fourier transform (DFT). However, the SC-FDMA is advantageous to decrease Tx power since a Tx signal has a low PAPR. In particular, regarding battery usage, the SC-FDMA is advantageous in case of uplink transmission where communication is achieved from a UE sensitive to Tx power to a base station (BS). When the UE transmits data to the BS, the transmitted data does not require a large bandwidth but a wide coverage is important for power concentration. The SC-FDMA system allows a small signal variation, and thus has a much wider coverage than other systems when using the same power amplifier. Meanwhile, unlike the SC-FDMA system, clustered DFT-spread-OFDM (DFT-S-OFDM) allocates (or maps) M(<N) symbol streams among N symbol streams which are DFT spread, and allocates (or maps) the remaining N-M symbol streams to consecutive subcarriers spaced apart by a specific interval from a subcarrier on which the M symbol streams are allocated (or mapped). Advantageously, frequency selective scheduling can be performed when using the clustered DFT-S-OFDM.

However, it should be noticed that the SC-FDMA scheme is applied when a single-carrier property is satisfied. A wireless communication system has to be able to provide transmit diversity for decreasing the PAPR by using the SC-FDMA scheme or the clustered DFT-S-OFDM scheme. The aforementioned STBC is one of the transmit diversity schemes and obtains the diversity gain by applying selectivity in a spatial domain and a time domain. There is a need for an apparatus and method for data transmission capable of providing the transmit diversity for decreasing the PAPR by using STBC.

DISCLOSURE OF INVENTION

Technical Problem

The present invention provides an apparatus and method for data transmission capable of decreasing a peak-to-average power ratio (PAPR) while providing transmit diversity using space time block coding (STBC).

Technical Solution

According to an aspect of the present invention, an apparatus for data transmission is provided. The apparatus includes a data processor encoding an information bit and generating a modulation symbol by performing constellation mapping on the encoded information bit, a discrete Fourier transform (DFT) unit performing DFT on the modulation symbol to generate a frequency-domain symbol, a space time block coding (STBC) processor performing STBC on the frequency-domain symbol to generate an STBC code consisting of 1st and 2nd STBC streams, a subcarrier mapper mapping the 1st STBC stream to a 1st subcarrier and mapping the 2nd STBC stream to a 2nd subcarrier, wherein the 1st subcarrier belongs to a 1st resource block and the 2nd subcarrier belongs to a 2nd resource block while the 1st and 2nd resource blocks is located at the same frequency band of different slots, an inverse fast Fourier transform (IFFT) unit performing IFFT on the 1st subcarrier to generate a 1st single carrier-frequency division multiple access (SC-FDMA) symbol and performing IFFT on the 2nd subcarrier to generate a 2nd SC-FDMA symbol, and a plurality of transmit antennas transmitting the 1st and 2nd SC-FDMA symbols.

According to another aspect of the present invention, a method for data transmission using transmit diversity in a single carrier-frequency division multiple access (SC-FDMA) system is provided. The method includes encoding an information bit and generating a modulation symbol by performing constellation mapping on the encoded information bit, generating a frequency-domain symbol by performing discrete Fourier transform (DFT) on the modulation symbol, generating a space time block coding (STBC) code by performing STBC on the frequency-domain symbol, mapping the STBC code to a plurality of corresponding SC-FDMA symbols, wherein the plurality of SC-FDMA symbols are generated by performing inverse fast Fourier transform (IFFT) on subcarriers of the same frequency-band, and transmitting the plurality of SC-FDMA symbols.

Advantageous Effects

Space time block coding (STBC) is effectively applied to a single carrier-frequency division multiple access (SC-FDMA) system to decrease a peak-to-average power ratio (PAPR) and to maintain a single-carrier property.

MODE FOR THE INVENTION

Figure 1:
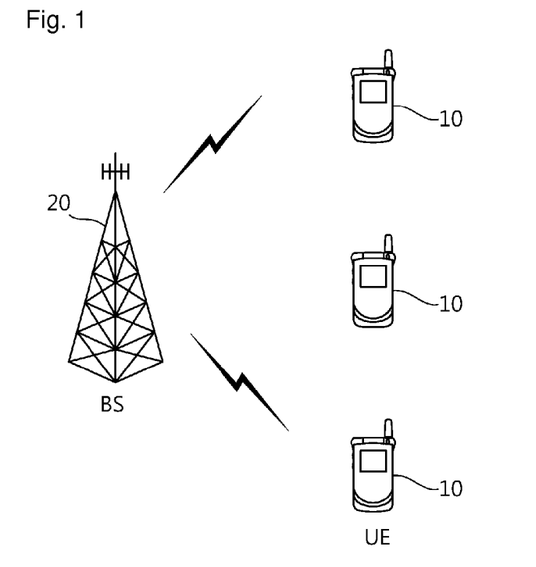
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

There is no restriction on multiple access schemes used in the wireless communication system. In addition to well-known modulation schemes, various multiple access schemes may be used such as code division multiple access (CDMA), time division multiple access (TDMA), frequency division multiple access (FDMA), single-carrier FDMA (SC-FDMA), orthogonal frequency division multiple access (OFDMA), etc. These modulation schemes can increase system capacity by demodulating signals received from multiple users of the communication system.

DL transmission and UL transmission may use different multiple access schemes. For example, DL transmission may use OFDMA, and UL transmission may use SC-FDMA or clustered discrete Fourier transform spread orthogonal frequency division multiplexing (DFT-S-OFDM). A typical SC-FDMA scheme implies that DFT-spread symbol streams are allocated (or mapped) to consecutive subcarriers or equally-spaced subcarriers. The clustered DFT-S-OFDM allocates (or maps) M(<N) symbol streams among N symbol streams which are DFT spread, and allocates (or maps) the remaining N-M symbol-streams to consecutive subcarriers spaced apart by a specific interval from a subcarrier on which the M symbol streams are allocated (or mapped). Advantageously, frequency selective scheduling can be performed when using the clustered DFT-S-OFDM.

Figure 2:
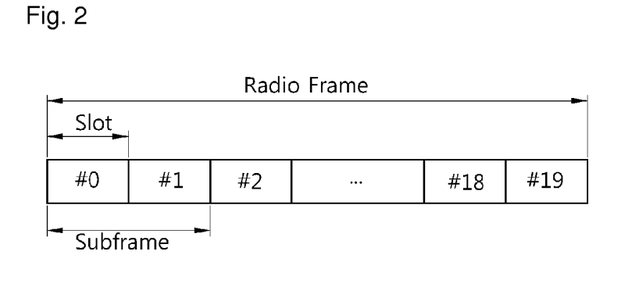
FIG. 2 shows an example of a radio frame structure.

FIG. 2 shows an example of a radio frame structure.

Referring to FIG. 2, a radio frame consists of 10 subframes. One subframe may include two slots. One slot may include a plurality of SC-FDMA symbols (or OFDM symbols) in a time domain and at least one subcarrier in a frequency domain. The slot may be a unit of allocating radio resources in the time domain and the frequency domain.

The number of SC-FDMA symbols included in one slot may vary according to con-figuration of a cyclic prefix (CP). The CP is classified into an extended CP and a normal CP. For example, if the SC-FDMA symbols are configured by the normal CP, the number of SC-FDMA symbols included in one slot may be 7. If the SC-FDMA symbols are configured by the extended CP, a length of one SC-FDMA symbol is decreased, and thus the number of SC-FDMA symbols included in one slot is less than that of the case of using the normal CP. For example, the number of SC-FDMA symbols included in one slot may be 6. In a case where a channel condition is unstable, for example, when a UE moves in a fast speed, the extended CP can be used to further decrease inter-symbol interference or may be used to provide a multimedia broadcast multicast service (MBMS).

The structure of the radio frame is for exemplary purposes only, and thus the number of subframes included in the radio frame, the number of slots included in the subframe, and the number of SC-FDMA symbols included in the slot may also change variously.

Figure 3:
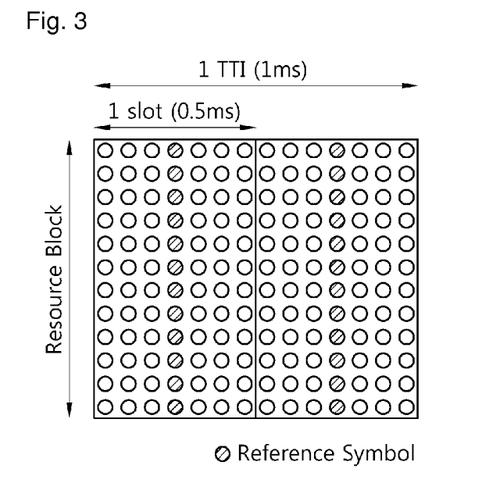
FIG. 3 shows an example of a radio frame structure.

FIG. 3 shows an example of a subframe. Herein, an SC-FDMA symbol is configured with a normal CP.

Referring to FIG. 3, the subframe includes two slots. Since the SC-FDMA symbol is configured with the normal CP, one slot includes 7 SC-FDMA symbols in a time domain. Therefore, one subframe includes 14 SC-FDMA symbols in total. Meanwhile, one slot includes a plurality of resource blocks (RBs) in a frequency domain. A unit consisting of one SC-FDMA symbol and one subcarrier is referred to as a resource element. When one RB includes 12 subcarriers, one RB includes 12×7 resource elements. One SC-FDMA symbol in each slot is allocated for transmission of a de-modulation reference signal (DMRS) used for data demodulation. The remaining SC-FDMA symbols are allocated for data transmission, and thus 12 SC-FDMA symbols in total are allocated for data transmission within one subframe. If a sounding reference signal (SRS) for uplink channel estimation is transmitted on one SC-FDMA symbol in addition to the DMRS, 11 SC-FDMA symbols in total are allocated for data transmission within one subframe. The SRS can be transmitted on a last SC-FDMA symbol of a 2nd slot.

The structure of the subframe is for exemplary purposes only. Thus, the number of slots included in the subframe, the number of SC-FDMA symbols included in the slot, and a position of the SC-FDMA symbol on which the DMRS is transmitted may change variously.

Figure 4:
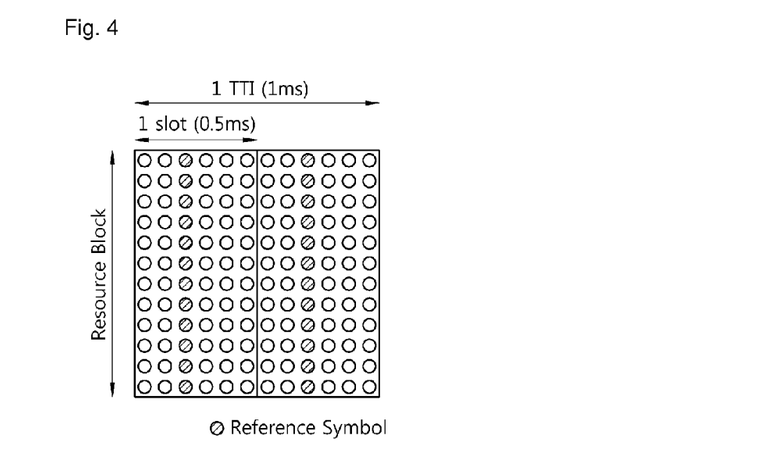
FIG. 4 shows another example of a subframe.

FIG. 4 shows another example of a subframe. Herein, an SC-FDMA symbol is configured with an extended CP.

Referring to FIG. 4, unlike the subframe structure of FIG. 3, the SC-FDMA symbol is configured with the extended CP, thus one slot includes 6 SC-FDMA symbol in a time domain. Therefore, one subframe includes 12 SC-FDMA symbols in total. One subframe is 1 transmission time interval (TTI), where 1 TTI is 1 millisecond (ms). Each slot has a length of 0.5 ms. In each slot, one SC-FDMA symbol is allocated for transmission of a DMRS used for data demodulation. The remaining SC-FDMA symbols are allocated for data transmission, and thus 10 SC-FDMA symbols in total are allocated for data transmission within one subframe. If an SRS for uplink channel estimation is transmitted on one SC-FDMA symbol in addition to the DMRS, 9 SC-FDMA symbols in total are allocated for data transmission within one subframe. The SRS can be transmitted on a last SC-FDMA symbol of a 2nd slot. The structure of the subframe is for exemplary purposes only. Thus, the number of slots included in the subframe, the number of SC-FDMA symbols included in the slot, and a position of the SC-FDMA symbol on which the DMRS is transmitted may change variously.

The wireless communication system may be a multiple antenna system. The multiple antenna system may be a multiple input multiple output (MIMO) system. The multiple antenna system may be a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

The multiple antenna system can operate by using various multiple antenna Tx/Rx schemes such as space time block coding (STBC), space frequency block coding (SFBC), frequency switched transmit diversity (FSTD), cyclic delay diversity (CDD), time switched transmit diversity (TSTD), etc. In the STBC, a signal is split and transmitted in time and spatial domains, and signals received for respective antennas are determined by a maximum likelihood combining scheme.

Figure 5:
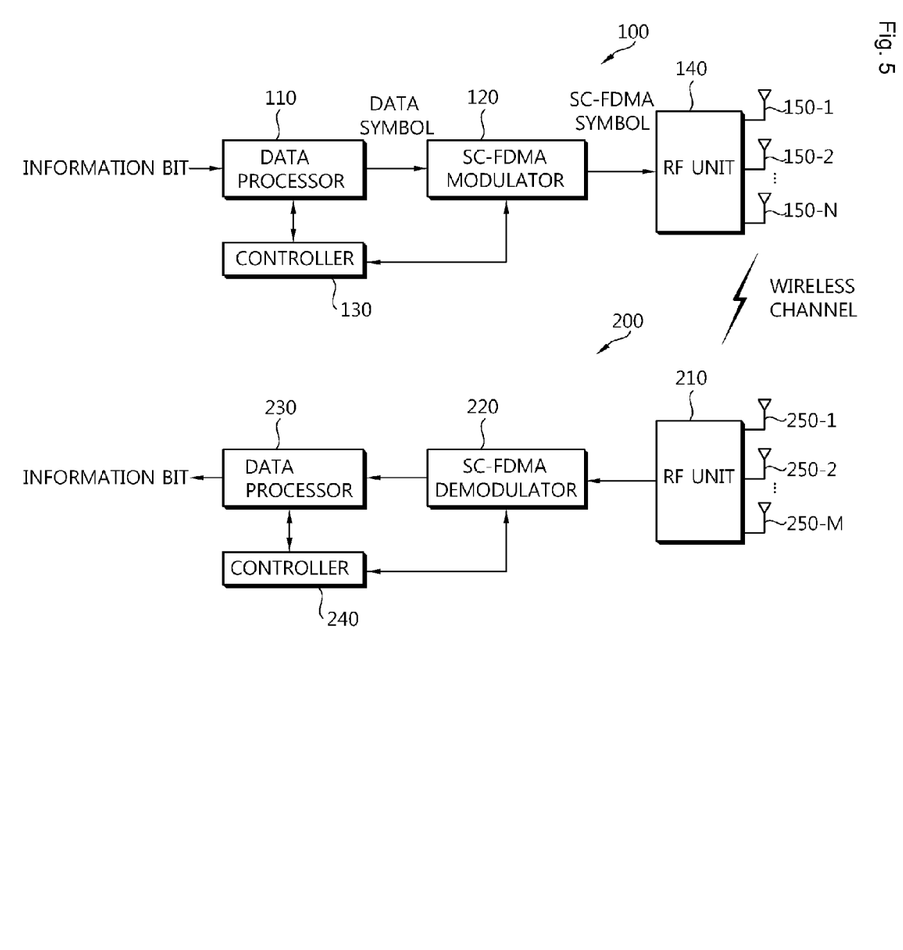
FIG. 5 is a diagram for explaining a wireless communication system using an STBC scheme.

FIG. 5 is a diagram for explaining a wireless communication system using an STBC scheme.

Referring to FIG. 5, the wireless communication system using the STBC includes a transmitter 100 and a receiver 200. The transmitter 100 includes a data processor 110, an SC-FDMA modulator 120, a controller 130, a radio frequency (RF) unit 140, and Tx antennas 150-1, 150-2, . . . , 150-N.

The data processor 110 performs channel coding on an input information bit to generate a codeword, and performs constellation mapping on the codeword to generate a modulation symbol. The information bit includes user plane information to be transmitted to the receiver 200. Further, the information bit may include control plane information in association with transmission of the user plane information or radio resource allocation.

The SC-FDMA modulator 120 performs STBC on a data symbol to generate an STBC code, and performs modulation using an SC-FDMA modulation scheme to generate an SC-FDMA symbol. The control plane information may be input to the SC-FDMA modulator 120 after being modulated independently from the user plane in-formation. The controller 130 controls operations of the data processor 110 and the SC-FDMA modulator 120. The RF unit 140 converts an input SC-FDMA symbol into an analog signal. The converted analog signal is propagated to a wireless channel through the Tx antennas 150-1, 150-2, . . . , 150-N.

The receiver 200 includes an RF unit 210, an SC-FDMA demodulator 220, a data processor 230, a controller 240, and Rx antennas 250-1, 250-2, . . . , 250-M.

The RF unit 210 converts signals received through the Rx antennas 250-1, 250-2, . . . , 250-M into digital signals. The SC-FDMA demodulator 220 outputs a data symbol by performing a counterpart operation of the modulation performed by the SC-FDMA modulator 120. The data processor 230 recovers an information bit from the data symbol. The controller 240 controls operations of the SC-FDMA demodulator 220 and the data processor 230.

Figure 6:
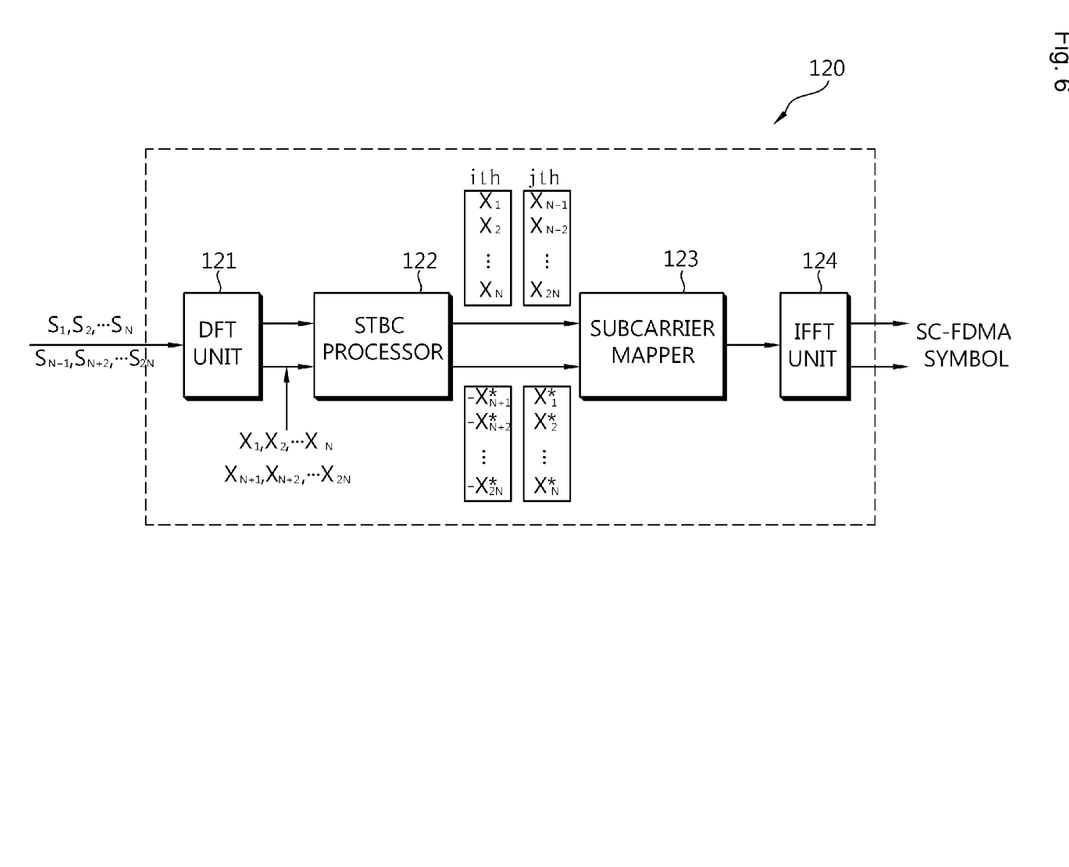
FIG. 6 is a block diagram showing an example of an SC-FDMA modulator.

FIG. 6 is a block diagram showing an example of an SC-FDMA modulator. An STBC scheme is applied to the SC-FDMA modulator. It is assumed herein that the number of Tx antennas is 2.

Referring to FIG. 6, an SC-FDMA modulator 120 includes a discrete Fourier transform (DFT) unit 121 for performing DFT, an STBC processor 122, a subcarrier mapper 123, and an inverse fast Fourier transform (IFFT) unit 124 for performing IFFT.

The DFT unit 121 performs DFT on 2N input data symbol streams $S_1, S_2, \ldots, S_N, S_{N+1}, \ldots, S_{2N}$ to output frequency-domain symbol streams $X_1, X_2, \ldots, X_N, X_{N+1}, \ldots, X_{2N}$. If a DFT size is N, DFT spreading is performed for N data symbol streams simultaneously. The data symbol streams input to the DFT unit 121 may be control plane information and/or user plane information. The DFT size may be fixed to a size of allocated resource blocks, or may vary depending on systems.

The STBC processor 122 blocks the frequency-domain symbol streams $X_1, X_2, \ldots, X_N, X_{N+1}, \ldots, X_{2N}$ for each antenna and for each time according to the STBC scheme to generate STBC codes $[(X_1, X_2, \ldots, X_N), (-X^*_{N+1}, -X^*_{N+2}, \ldots, -X^*_{2N}), (X_{N+1}, X_{N+2}, \ldots, X_{2N}), (X^*_1, X^*_2, \ldots, X^*_N)]$. 1st STBC streams $(X_1, X_2, \ldots, X_N)$ and $(-X^*_{N+1}, -X^*_{N+2}, \ldots, -X^*_{2N})$ correspond to subcarriers of an ith SC-FDMA symbol. 2nd STBC streams $(X_{N+1}, X_{N+2}, \ldots, -X_{2N})$ and $(X^*_1, X^*_2, \ldots, X^*_N)$ correspond to subcarriers of a jth SC-FDMA symbol. An STBC code provided by the STBC processor 122 is defined by a transport matrix G having a size of $p \times n_T$. Herein, p denotes a length of the STBC code, and nT denotes the number of Tx antennas. G is generated by linear combination of symbols $x_1, x_2, \ldots, x_p$ and their complex conjugate numbers. Different codewords are simultaneously transmitted to respective Tx antennas. If an STBC length is 2 and an STBC system has two Tx antennas, the transport matrix G is expressed by Equation 1 below.

MathFigure 1

$$G = \begin{bmatrix} x_1 & x_2 \\ -x_2^* & x_1^* \end{bmatrix} \text{ or } G = \begin{bmatrix} x_1 & -x_2^* \\ x_2 & x_1^* \end{bmatrix} \qquad [\text{Math. 1}]$$

The STBC streams generated by $$G = \begin{bmatrix} x_1 & x_2 \\ -x_2^* & x_1^* \end{bmatrix}$$

have a mapping relation with respect to the Tx antenna and the SC-FDMA symbol as shown in Table 1 below.

TABLE 1

| Ð | ith SC-FDMA suymbol | jth SC-FDMA suymbol |
|---|---|---|
| 1st Tx antenna | $X_1, X_2, \ldots, X_N$ Ð | $X_{N+1}, X_{N+2}, \ldots, X_{2N}$ Ð |
| 2nd Tx antenna | $-X^*_{N+1}, -X^*_{N+2}, \ldots, -X^*_{2N}$ Ð | $X^*_1, X^*_2, \ldots, X^*_N$ Ð |

Referring to Table 1, the 1st STBC streams $(X_1, X_2, \ldots, X_N)$ and $(-X^*_{N+1}, -X^*_{N+2}, \ldots, -X^*_{2N})$ are mapped to the ith SC-FDMA symbol. Herein, $(X_1, X_2, \ldots, X_N)$ is transmitted through a 1st Tx antenna, and $(-X^*_{N+1}, -X^*_{N+2}, \ldots, -X^*_{2N})$ is transmitted through a 2nd Tx antenna. Further, the 2nd STBC streams $(X_{N+1}, X_{N+2}, \ldots, X_{2N})$ and $(X^*_1, X^*_2, \ldots, X^*_N)$ are mapped to the jth SC-FDMA symbol. Herein, $(X_{N+1}, X_{N+2}, \ldots, X_{2N})$ is transmitted through the 1st Tx antenna, and $(X^*_1, X^*_2, \ldots, X^*_N)$ is transmitted through the 2nd Tx antenna.

The subcarrier mapper 123 maps STBC codes $(X_1, X_2, \ldots, X_N)$, $(-X^*_{N+1}, -X^*_{N+2}, \ldots, -X^*_{2N})$, $(X_{N+1}, X_{N+2}, \ldots, X_{2N})$ and $(X^*_1, X^*_2, \ldots, X^*_N)$ respectively to subcarriers allocated according to scheduling information. The allocated subcarriers are all located in the same frequency bands without being frequency-hopped for each slot. For example, if a plurality of resource blocks are allocated to the transmitter, the respective resource blocks occupy the same frequency bands on consecutive slots. The resource block implies a physical resource including a plurality of subcarriers.

The IFFT unit 124 outputs time-domain SC-FDMA symbols by performing IFFT on the subcarriers to which the STBC codes are mapped. The ith SC-FDMA symbol and the jth SC-FDMA symbol are generated according to a time sequence. Although only one IFFT unit 124 is shown herein, this is for exemplary purposes only. Thus, the number of IFFT units 124 may vary depending on the number of Tx antennas. A scheme for performing modulation by combining DFT and IFFT is referred to as SC-FDMA, and is advantageous over OFDM in terms of decreasing a peak-to-average power ratio (PAPR). This is because the SC-FDMA has a single-carrier property.

The STBC scheme can be applied to the SC-FDMA system only when the single-carrier property is satisfied. In order for the STBC code generated by the transport matrix G to satisfy the single-carrier property, SC-FDMA symbols in the same frequency band need to be paired. That is, the number of SC-FDMA symbols has to be an even number. In case of FIG. 4, one slot includes 5 SC-FDMA symbols used for data, and thus one slot has one unpaired SC-FDMA symbol.

As such, if there is an unpaired SC-FDMA symbol transmitted within one slot, the SC-FDMA system cannot satisfy the single-carrier property, and thus the STBC scheme cannot be applied to the SC-FDMA system. To solve this problem, radio resources can be scheduled by using an allocation scheme in which allocation is performed on a 2-slot basis while two resource blocks allocated throughout two slots are allocated to the same frequency band. The allocation scheme is different from a typical allocation scheme for obtaining frequency diversity by allocating resource blocks while being frequency-hopped on a slot basis. That is, the allocation scheme does not have the frequency diversity since the resource blocks arranged throughout the two slots have the same frequency band, but the allocation scheme can have a spatial diversity gain according to the STBC scheme.

Two consecutive slots (or one subframe) include an even number of SC-FDMA symbols used for data irrespective of whether the SC-FDMA symbol is configured with the extended CP or the normal CP. However, the number of SC-FDMA symbols used for data and included in the two consecutive slots is different. That is, in case of the extended CP, 10 SC-FDMA symbols used for data are included in the two consecutive slots, and in case of the normal CP, 12 SC-FDMA symbols used for data are included in the two consecutive slots.

A process of paring SC-FDMA symbols to apply the STBC scheme to the SC-FDMA system is referred to as symbol pairing. A pair of SC-FDMA symbols paired by the symbol paring is referred to as a symbol pair. The ith SC-FDMA symbol and the jth SC-FDMA of FIG. 6 are symbol pairs. Hereinafter, a symbol pair of the ith SC-FDMA symbol and the jth SC-FDMA will be expressed by (#i, #j).

Figure 7:
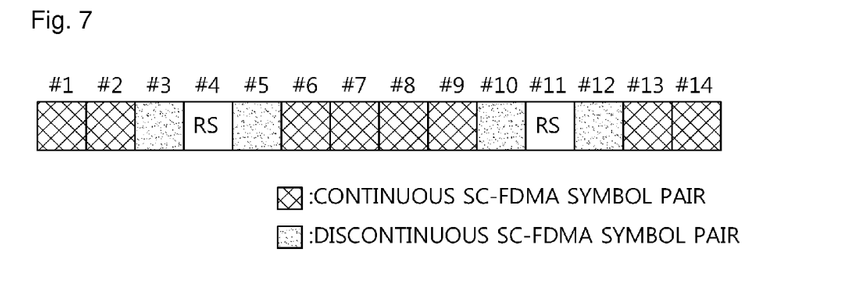
FIG. 7 shows an example of symbol paring within a subframe.

FIG. 7 shows an example of symbol paring within a subframe.

Referring to FIG. 7, the subframe includes 14 SC-FDMA symbols in total. That is, the SC-FDMA symbol is configured with a normal CP. A DMRS is mapped to 4th and 11th SC-FDMA symbols, and data is mapped to the remaining SC-FDMA symbols. The data may be user plane information or control plane information.

Except for the SC-FDMA symbols used for the DMRS, the number of SC-FDMA symbols used for data is 12 (i.e., even number), thus symbol paring can be performed. The number of symbol pairs is 6 in total, that is, (#1, #2), (#3, #5), (#6, #7), (#8, #9), (#10, #12), and (#13, #14). A symbol pair for a case where a reference signal (RS) exists between the ith SC-FDMA symbol and the jth SC-FDMA is referred to as a discontinuous SC-FDMA symbol pair. In this case, j=i+2. Meanwhile, a symbol pair for a case where the ith SC-FDMA symbol and the jth SC-FDMA are contiguous is referred to as a continuous SC-FDMA symbol pair. In this case, j=i+1.

SC-FDMA symbols to be paired are included in resource blocks of the same frequency domain. The proposed symbol pair is for exemplary purposes only, and thus combination of SC-FDMA symbols paired as a symbol pair can change variously.

Figure 8:
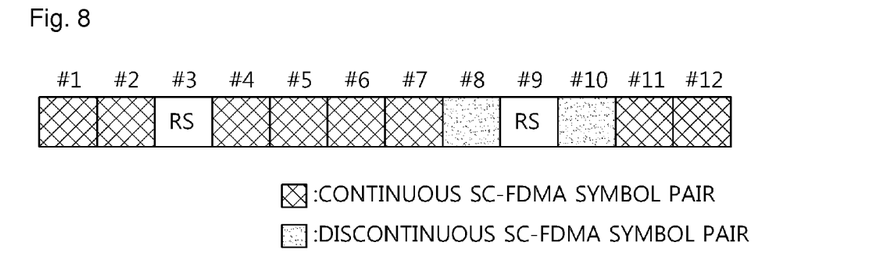
FIG. 8 shows another example of symbol paring within a subframe.

FIG. 8 shows another example of symbol paring within a subframe.

Referring to FIG. 8, the subframe includes 12 SC-FDMA symbols in total. That is, the SC-FDMA symbol is configured with an extended CP. A DMRS is mapped to 3rd and 9th SC-FDMA symbols, and data is mapped to the remaining SC-FDMA symbols. The data may be user plane information or control plane information.

Except for the SC-FDMA symbols used for the DMRS, the number of SC-FDMA symbols used for data is 10 (i.e., even number), thus symbol paring can be performed. The number of symbol pairs is 5 in total, that is, (#1, #2), (#4, #5), (#6, #7), (#8, #10), and (#11, #12). Herein, (#6, #7) is a symbol pair of SC-FDMA symbols included in different slots. When STBC is applied by performing symbol paring on the SC-FDMA symbols included in the different slots, the SC-FDMA symbols to be paired are included in resource blocks in the same frequency domain. This is to maintain the single-carrier property of the SC-FDMA system. If a 7th SC-FDMA symbol is hopped to another frequency band by frequency hopping, the single-carrier property is not maintained in the symbol pair (#6, #7). Therefore, scheduling has to be performed so that subcarriers of the same frequency band are allocated to two consecutive slots.

Figure 9:
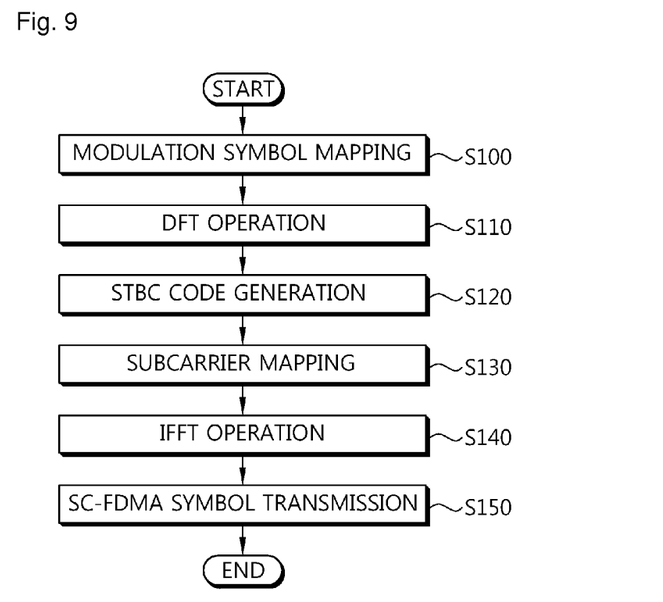
FIG. 9 is a flowchart showing a method for data transmission in an SC-FDMA system using an STBC scheme.

FIG. 9 is a flowchart showing a method for data transmission in an SC-FDMA system using an STBC scheme.

Referring to FIG. 9, a coded information bit is mapped to a modulation symbol (step S100). The modulation symbol may be a symbol obtained by a modulation scheme such as binary phase shift keying (BPSK), quadrature phase shift keying (QPSK), 16 quadrature amplitude modulation (QAM), etc. For example, in case of BPSK, one bit (i.e., 0 or 1) can be expressed for one modulation symbol, and in case of QPSK, two bits (i.e., 00, 01, 10, and 11) can be expressed for one modulation symbol.

DFT is performed on the modulation symbol (step S110). A DFT size may be predetermined or may vary depending on systems. The DFT size indicates the number of concurrently spreadable modulation symbols (or the number of allocated subcarriers). Each modulation symbol is mapped to a frequency-domain symbol by the DFT process.

An STBC code is generated by applying the STBC scheme to the frequency-domain symbol (step S120).

The STBC code is mapped to a subcarrier (step S130). The subcarrier to which the STBC code is mapped is located in the same frequency band for every TTI that is a time unit for transmitting a subframe. That is, frequency hopping is not performed when the subcarrier is allocated. In doing so, the STBC code can be mapped to the subcarrier of the same frequency band in every slot. This is to satisfy the single-carrier property by matching a frequency band between SC-FDMA symbols to be paired in the SC-FDMA system using the STBC.

IFFT is performed on the subcarrier to which the STBC code is mapped (step S140). As a result of performing the IFFT on the subcarrier, a time-domain SC-FDMA is generated. Continuous or discontinuous SC-FDMA symbols are subjected to symbol pairing. The SC-FDMA symbol is transmitted (step S150).

All functions described above may be performed by a processor such as a micro-processor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. An apparatus for data transmission, the apparatus comprising:
    a data processor encoding an information bit and generating a modulation symbol by performing constellation mapping on the encoded information bit;
    a discrete Fourier transform (DFT) unit performing DFT on the modulation symbol to generate a frequency-domain symbol;
    a space time block coding (STBC) processor performing STBC on the frequency-domain symbol to generate an STBC code having 1st and 2nd STBC streams;
    a subcarrier mapper mapping the 1st STBC stream to a 1st subcarrier and mapping the 2nd STBC stream to a 2nd subcarrier, wherein the 1st subcarrier belongs to a 1st rsource block and the 2nd subcarrier belongs to a 2nd resource block while the 1st and 2nd resource blocks are located at the same frequency band of different slots;
    an inverse fast Fourier transform (IFFT) unit performing IFFT on the 1st subcarrier to generate a 1st single carrier-frequency division multiple access (SC-FDMA) symbol and performing IFFT on the 2nd subcarrier to generate a 2nd SC-FDMA symbol; and
    a plurality of transmit antennas transmitting the 1st and 2nd SC-FDMA symbols,
    wherein the 1st SC-FDMA symbol and the 2nd SC-FDMA symbol are included in different slots.

2. The apparatus of claim 1, wherein the 1st SC-FDMA symbol and the 2nd SC-FDMA symbol are contiguous to each other.

3. The apparatus of claim 1, wherein the 1st SC-FDMA symbol and the 2nd SC-FDMA symbol are spaced apart from each other.

4. The apparatus of claim 1, wherein the 1st and 2nd SC-FDMA symbols are configured with an extended cyclic prefix (CP).

5. The apparatus of claim 1, wherein the 1st and 2nd SC-FDMA symbols are configured with a normal CP.

6. A method for data transmission using transmit diversity in a single carrier-frequency division multiple access (SC-FDMA) system, the method comprising:
    encoding an information bit and generating a modulation symbol by performing constellation mapping on the encoded information bit;
    generating a frequency-domain symbol by performing discrete Fourier transform (DFT) on the modulation symbol;
    generating a space time block coding (STBC) code by performing STBC on the frequency-domain symbol;
    mapping the STBC code to a plurality of corresponding SC-FDMA symbols, wherein the plurality of SC-FDMA symbols are generated by performing inverse fast Fourier transform (IFFT) on subcarriers of the same frequency-band; and
    transmitting the plurality of SC-FDMA symbols,
    wherein the plurality of SC-FDMA symbols are included in different slots.

7. The method of claim 6, wherein the plurality of SC-FDMA symbols are contiguous within one subframe.

8. The method of claim 6, wherein an SC-FDMA symbol used for a demodulation reference signal for uplink data demodulation is located between the plurality of SC-FDMA symbols.

9. The method of claim 6, wherein the plurality of SC-FDMA symbols are transmitted via a plurality of antennas.

* * * * *